United States Patent
Yeom

(10) Patent No.: US 8,804,506 B2
(45) Date of Patent: Aug. 12, 2014

(54) VOICE/DATA COMBINATION SYSTEM AND METHOD FOR MANAGING BANDWIDTH IN THE SYSTEM

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 12/010,084

(22) Filed: Jan. 18, 2008

(65) Prior Publication Data

US 2008/0175271 A1    Jul. 24, 2008

(30) Foreign Application Priority Data

Jan. 22, 2007  (KR) ........................ 10-2007-0006618

(51) Int. Cl.
*H04J 3/16* (2006.01)

(52) U.S. Cl.
USPC .......................................... 370/230; 370/468

(58) Field of Classification Search
USPC ......... 370/229, 230, 254, 289, 329, 346, 406, 370/444, 449, 468
See application file for complete search history.

(56) References Cited

U.S. PATENT DOCUMENTS

| | | | |
|---|---|---|---|
| 5,555,266 A * | 9/1996 | Buchholz et al. ............. | 370/347 |
| 5,687,167 A * | 11/1997 | Bertin et al. .................. | 370/254 |
| 6,411,601 B1 | 6/2002 | Shaffer et al. | |
| 6,907,004 B1 * | 6/2005 | Ramsey et al. ............... | 370/235 |
| 2004/0213197 A1 * | 10/2004 | Zimmerman et al. ........ | 370/346 |
| 2005/0201414 A1 | 9/2005 | Awais | |
| 2006/0253675 A1 | 11/2006 | Johannes Bloks et al. | |
| 2006/0285493 A1 * | 12/2006 | Manuja et al. ................ | 370/235 |

FOREIGN PATENT DOCUMENTS

EP          1083730        * 3/2001    ............. H04M 7/00

OTHER PUBLICATIONS

Notice of Decision to Grant Patent dated Jan. 28, 2014 in Korea Patent Application No. 10-2007-0006618.

* cited by examiner

*Primary Examiner* — Habte Mered
*Assistant Examiner* — Prince A Mensah
(74) *Attorney, Agent, or Firm* — H.C. Park & Associates, PLC

(57) ABSTRACT

A voice/data combination system and a method that manages a bandwidth in the system. A determination is made as to whether a bandwidth for real-time data service is available, and the bandwidth, when not available, is reserved, so that the real-time data service is performed when the bandwidth is available. The system reserves predetermined bandwidths for real-time packets when bandwidth of real-time packets is not available, and process the real-time packets in their corresponding reserved bandwidth when bandwidth is available. Therefore, real-time packets and general packets are always processed in their corresponding bandwidths.

10 Claims, 4 Drawing Sheets

FIG. 3A

```
INVITE sip:UserB@there.com SIP/2.0
Via: SIP/2.0/UDP here.com:5060
From: BigGuy <sip:UserA@here.com>;tag=1234567
To: LittleGuy <sip:UserB@there.com>
Call-ID: 12345601@here.com
CSeq: 1 INVITE
Contact: <sip:UserA@100.101.102.103>
Content-Type: application/sdp
Content-Length: ...

v=0
o=UserA 2890844526 2890844526 IN IP4 client.here.com
s=Session SDP
c=IN IP4 100.101.102.103
t=3034423619 0
m=audio 49170 RTP/AVP 0
a=rtpmap:0 PCMU/8000
```

FIG. 3B

```
MESSAGE sip:UserA@there.com SIP/2.0
Via: SIP/2.0/UDP here.com:5060
Record-Route: <sip:UserB@there.com;maddr=ss1.wcom.com>
From: BigGuy <sip:UserA@here.com>;tag=1234567
To: LittleGuy <sip:UserB@there.com>;tag=314159
Call-ID: 12345601@here.com
CSeq: 1 INVITE
Contact: <sip:UserB@110.111.112.113>
Content-Type: application/sdp
Content-Length: 22

Camp-On Bandwidth not Available
```

FIG. 3C

MESSAGE sip:UserA@there.com SIP/2.0
Via: SIP/2.0/UDP here.com:5060
Record-Route: <sip:UserB@there.com;maddr=ss1.wcom.com>
From: BigGuy <sip:UserA@here.com>;tag=1234567
To: LittleGuy <sip:UserB@there.com>;tag=314159
Call-ID: 12345601@here.com
CSeq: 1 INVITE
Contact: <sip:UserB@110.111.112.113>
Content-Type: application/sdp
Content-Length: 24

Camp-On Bandwidth 30kbps

FIG. 3D

MESSAGE sip:UserA@there.com SIP/2.0
Via: SIP/2.0/UDP here.com:5060
Record-Route: <sip:UserB@there.com;maddr=ss1.wcom.com>
From: BigGuy <sip:UserA@here.com>;tag=1234567
To: LittleGuy <sip:UserB@there.com>;tag=314159
Call-ID: 12345601@here.com
CSeq: 1 INVITE
Contact: <sip:UserB@110.111.112.113>
Content-Type: application/sdp
Content-Length: 26

Camp-On Bandwidth Reserved

VOICE/DATA COMBINATION SYSTEM AND METHOD FOR MANAGING BANDWIDTH IN THE SYSTEM

CLAIM OF PRIORITY

This application makes reference to, incorporates the same herein, and claims all benefits accruing under 35 U.S.C. §119 from an application for VOICE/DATA COMBINATION SYSTEM AND METHOD FOR MANAGING BANDWIDTH IN THE SYSTEM earlier filed in the Korean Intellectual Property Office on the 22 Jan. 2007 and there duly assigned Serial No. 2007-0006618.

BACKGROUND OF THE INVENTION

1. Field of the Invention

The present invention relates to a voice/data combination system and a method for managing a bandwidth in the system, more specifically, a voice/data combination system and a method for managing a bandwidth in the system in which a determination is made as to whether a bandwidth for real-time data service is available, and the bandwidth, when not available, is reserved, so that the real-time data service is performed when the bandwidth is available.

2. Description of the Related Art

With the widespread utilization of the Internet and a demand for a variety of services, an Internet protocol (IP) network has been significantly advanced in performance and service, which has resulted in an increasing demand for more services.

As one service demanded by customers, the IP network provides voice communication as well as data communication, and there is also a demand by customers for transmission service for a variety of voice services. Accordingly, a combination of voice over IP (VoIP) services by a terminal, such as a digital telephone and a single telephone, is necessary.

A voice/data combination system allows an existing terminal and an Internet terminal (e.g., a VoIP terminal) to communicate by transmission of data or voice over an IP network.

The voice/data combination system can provide VoIP service (i.e., Internet telephone service), Internet data service, and public switched telephone network (PSTN) telephone service.

For the VoIP service and the Internet data service, the voice/data combination system divides a bandwidth of a transmission medium (e.g., an optical cable) connected to the IP network in a virtual trunk way, and assigns the divided bandwidths to respective services.

Also, the voice/data combination system classifies services into real-time data service, such as VoIP service, and general data services.

The voice/data combination system performs traffic management by processing a real-time data service packet through assignment to Strict Priority Queuing (SPQ) and processing packets other than the real-time data service packet, i.e., a general data service packet, in a Weighted Round Robin (WRR) way.

A hypothetical representation of a typical traffic management in the voice/data combination system will now be described in greater details.

The voice/data combination system assigns a real-time data service packet to the SPQ and processes packets other than the real-time data service packet in the WRR way.

When a bandwidth for the SPQ is full, the voice/data combination system assigns a bandwidth required for the WRR for smooth processing of real-time data service and then performs the real-time data service. When the bandwidths for the SPQ and the WRR are full, the voice/data combination system drops an excessive packet using a traffic policy or a shaping scheme and retransmits the excessive packet when the bandwidth is available after a set time lapses. Therefore, this makes it difficult for the voice/data combination system to process the real-time data service in real time.

In other words, when the bandwidths assigned for the SPQ and the WRR are full, the voice/data combination system endeavors to equally process real-time data service, such as the VoIP service, and the general data service. Accordingly, traffic of the real-time data service, such as the VoIP service, is, undesirably, not processed in real time due to causes such as the occurrence of hop delay in the voice/data combination system.

SUMMARY OF THE INVENTION

It is, therefore, an object of the present invention to provide an improved voice and data system and an improved process for managing bandwidth in the system.

It is another object to provide a voice/data combination system and a method for managing a bandwidth in the system in which a determination is made as to whether a bandwidth for real-time data service is available, and the bandwidth, when not available, is reserved, so that the real-time data service is performed when the bandwidth is available.

The first aspect of the present invention provides a voice/data combination system that may be constructed with a terminal for generating and transmitting a real-time data service request message upon receipt of a request for real-time data service, generating and transmitting a bandwidth request message for real-time data service upon receipt of a message indicating that a bandwidth for real-time data service is unavailable, and then retransmitting the real-time data service request message upon receipt of a bandwidth reservation message; and a switch/router which checks a network bandwidth in response to the real-time data service request message, transmits a message indicating that the bandwidth, when unavailable, is unavailable, reserves the bandwidth in response to the bandwidth request message received from the terminal, and then transmits the bandwidth reservation message to the terminal when the bandwidth is available.

The second aspect of the present invention provides a voice/data combination system that may be constructed with a VoIP terminal generating and transmitting a VoIP call request message upon receipt of a request for a VoIP call, generating and transmitting a bandwidth request message for VoIP call upon receipt of a message indicating that the bandwidth for VoIP call unavailable, and then retransmitting the VoIP call request message upon receipt of a bandwidth reservation message; and a switch/router which checks a network bandwidth in response to the VoIP call request message, transmits a message indicating that the bandwidth, when unavailable, is unavailable, reserves the bandwidth in response to the bandwidth request message received from the VoIP terminal, and then transmits the bandwidth reservation message to the VoIP terminal when the bandwidth is available.

The switch/router may incorporate a VoIP ALG processor generating and transmitting a bandwidth check request message in response to the VoIP call request message from the VoIP terminal, and generating a message indicating that the bandwidth is unavailable to the VoIP terminal when information indicating that the bandwidth is unavailable is included in a bandwidth check response message; and a traffic manager checking a network state to see whether a prescribed bandwidth for the VoIP call is available in response to the bandwidth check request message, providing the bandwidth check response message including the check result information to the VoIP ALG processor, reserving the bandwidth in response to the bandwidth request message received from the VoIP terminal, and then transmitting the bandwidth reservation message to the VoIP terminal when the bandwidth is available.

The third aspect of the present invention provides a method able to manage a bandwidth in combined a voice/data system by generating and transmitting, through a terminal, a real-time data service request message upon receipt of a request for real-time data service; checking, by using a switch/router, a network bandwidth in response to the real-time data service request message and transmitting a message indicating that the bandwidth, when unavailable, is unavailable; generating and transmitting, through the terminal, a bandwidth request message for real-time data service in response to the message indicating that the bandwidth is unavailable; and reserving, by using the switch/router, the bandwidth in response to the bandwidth request message received from the terminal, and then transmitting a bandwidth reservation message to the terminal when the bandwidth is available.

The method may also perform a step of retransmitting, by using the terminal, the real-time data service request message in response to reception of the bandwidth reservation message from the switch/router.

The fourth aspect of the present invention provides a method able to manage a bandwidth in a voice/data combination system by generating and transmitting, by using a VoIP terminal, a VoIP call request message in response to reception of a VoIP call request; checking, by using a switch/router, a network bandwidth in response to reception of the VoIP call request message and transmitting a message indicating that the bandwidth, when unavailable, is unavailable, to the VoIP terminal; generating and transmitting, by using the VoIP terminal, a bandwidth request message for a VoIP call in response to the message indicating that the bandwidth is unavailable; and reserving, by using the switch/router, the bandwidth in response to the bandwidth request message received from the VoIP terminal, and then transmitting a bandwidth reservation message to the terminal when the bandwidth is available.

The method may also perform a step of retransmitting, by using the VoIP terminal, the VoIP request message in response to reception of the bandwidth reservation message.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 3A to 3D illustrate messages used for bandwidth management in the voice/data combination system constructed according to the principle of the present invention.

DETAILED DESCRIPTION OF THE INVENTION

A voice/data combination system and a method for managing a bandwidth in the system according to the present invention will be described in detail with reference to the accompanying drawings.

For ease of understanding the present invention, like numbers refer to like elements throughout the specification.

Figure 1:
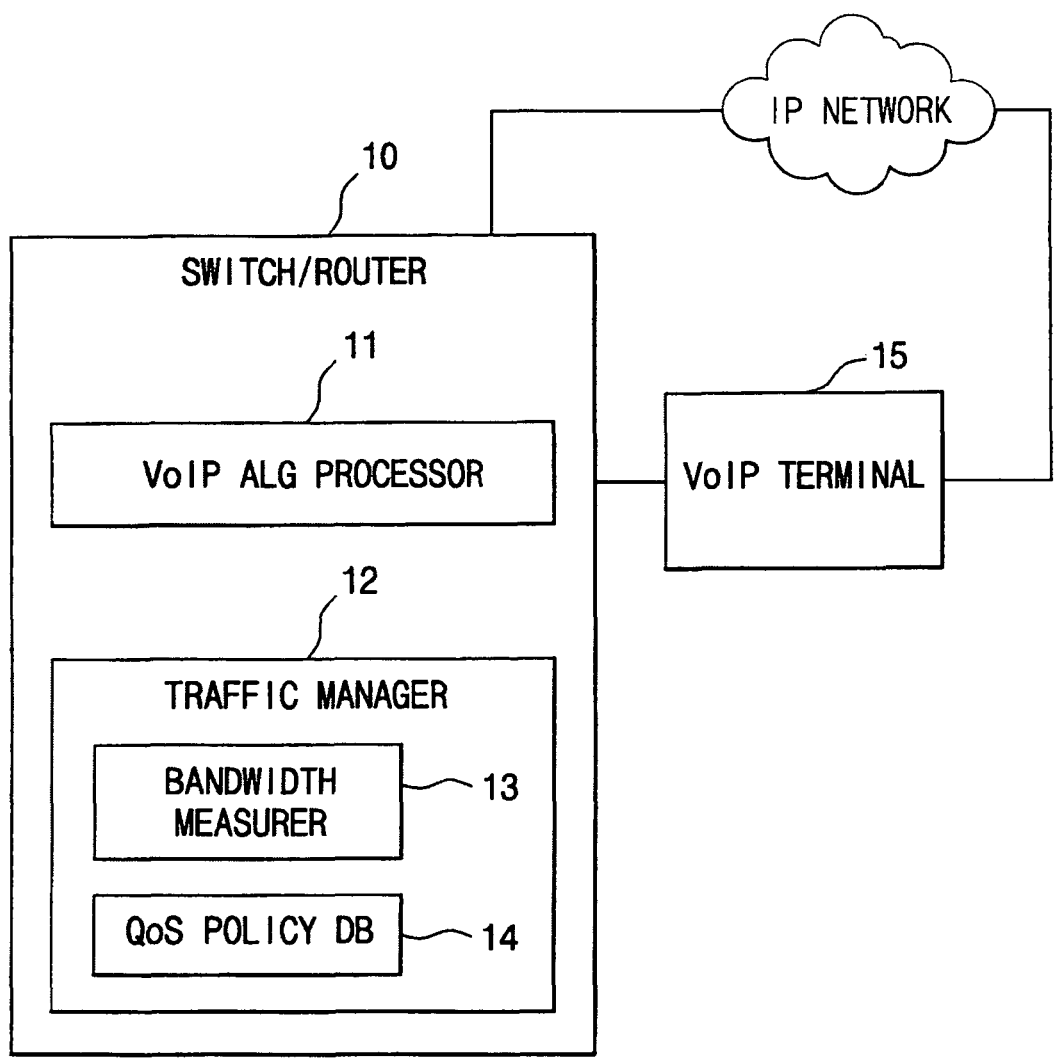
FIG. 1 is a block diagram illustrating a voice/data combination system constructed according to the principle of the present invention.

FIG. 1 is a block diagram illustrating a voice/data combination system constructed according to the principle of the present invention.

Referring to FIG. 1, the voice/data combination system may be constructed with a switch/router 10 and a VoIP terminal 15.

Switch/router 10 comprises a VoIP ALG (Application Layer Gateway) processor 11 and a traffic manager 12. Traffic manager 12 may be constructed with a bandwidth measurer 13 and a QoS policy database 14. "Switch/router" 10 refers to either a switch or a router, in other words, the reference number 10 may be one of a switch and a router.

Application Layer Gateway (ALG) is a security component that augments a firewall or Network Address Translation (NAT) employed in a computer network, and ALG allows legitimate application data to pass through the security checks of the firewall that would have otherwise restricted the traffic for not meeting its limited filter criteria. Network Address Translation (NAT) is a technique of transceiving network traffic through a router that involves re-writing the source and/or destination IP addresses when traffic passing passes through the router.

Switch/router 10 refers to either a switch or a router, in other words, the reference number 10 may be one of a switch and a router.

When a VoIP invite message for responding to the receipt of a VoIP call setup with any correspondent terminal is received from a VoIP terminal 15, VoIP ALG (Application Layer Gateway) processor 11 parses a payload of the VoIP invite message and changes a header of the VoIP invite message using a prescribed Network Address Translation (NAT) table.

The VoIP invite message may be a Session Initiation Protocol (SIP) message having a format as shown in FIG. 3A.

FIGS. 3A-3D show structures of four different SIP messages. FIG. 3A shows a VoIP invite message, FIG. 3B shows an SIP message having information indicating that the bandwidth is unavailable, FIG. 3C shows an SIP message having the bandwidth request information indicating that a bandwidth of 30 kps is necessary for the VoIP service, and FIG. 3D shows an SIP message having the bandwidth reservation information. The present invention concerns the information of bandwidth that the SIP messages include, therefore, only the information of bandwidth contained in the SIP messages will be specifically described in the specification.

VoIP ALG processor 11 generates a bandwidth check request message and sends the check request message to traffic manager 12 in order to check the availability of a bandwidth of a traffic being processed by traffic manager 12. Bandwidth check request message is a request message of checking the availability of the bandwidth for a VoIP call upon receipt of a request for the VoIP call.

Upon receipt of the bandwidth check request message from VoIP ALG processor 11, bandwidth measurer 13 of traffic manager 12 determines whether the bandwidth for VoIP service is available, based on the bandwidth of the traffic being processed and bandwidth information for VoIP service stored in QoS policy database 14.

Bandwidth measurer 13 provides a bandwidth check response message to VoIP ALG processor 11 and the response message including information indicating whether the bandwidth for VoIP service is available.

When the information indicating that the bandwidth is available is included in the bandwidth check response message provided by bandwidth measurer 13, VoIP ALG processor 11 transmits the VoIP invite message having the changed header to the correspondent terminal over an IP network.

Alternatively, when information indicating that the bandwidth is unavailable is included in the bandwidth check response message provided by bandwidth measurer 13, VoIP ALG processor 11 generates a message and sends the message to VoIP terminal 15 indicating that the bandwidth is unavailable. In this case, the message indicating that the bandwidth is unavailable may be composed in a format of an SIP message as shown in FIG. 3b, including information indicating that the bandwidth is unavailable, such as "Camp-On Bandwidth not Available".

Upon receipt of the message indicating that the bandwidth is unavailable from VoIP ALG processor 11, VoIP terminal 15 generates a bandwidth request message and sends the bandwidth request message to VoIP ALG processor 11. When the bandwidth request message is received from VoIP terminal 15, VoIP ALG processor 11 provides the received bandwidth request message to traffic manager 12. In this case, the bandwidth request message may be composed in an SIP message format as shown in FIG. 3C, including the bandwidth request information, "Camp-On Bandwidth 30 kbps". The bandwidth request information, "Camp-On Bandwidth 30 kbps" indicates that a bandwidth of 30 kps is necessary for the VoIP service.

Meanwhile, after providing the bandwidth request message to VoIP ALG processor 11, VoIP terminal 15 preferably sends a VoIP call setup termination message to VoIP ALG processor 11.

Traffic manager 12 reserves the bandwidth based on the bandwidth allocation information included in the bandwidth request message provided by VoIP ALG processor 11, and transmits a bandwidth reservation message to VoIP terminal 15 via VoIP ALG processor 11 when the bandwidth is available.

In this case, the bandwidth reservation message may be composed in an SIP message format as shown in FIG. 3D, including the bandwidth reservation information, "Camp-On Bandwidth Reserved".

When the bandwidth reservation message is received from traffic manager 12, VoIP terminal 15 retransmits the VoIP invite message as shown in FIG. 3A to switch/router 10.

Operation between switch/router 10 and VoIP terminal 15 is the same as the above described operation, and thus, it will be omitted.

Figure 2:
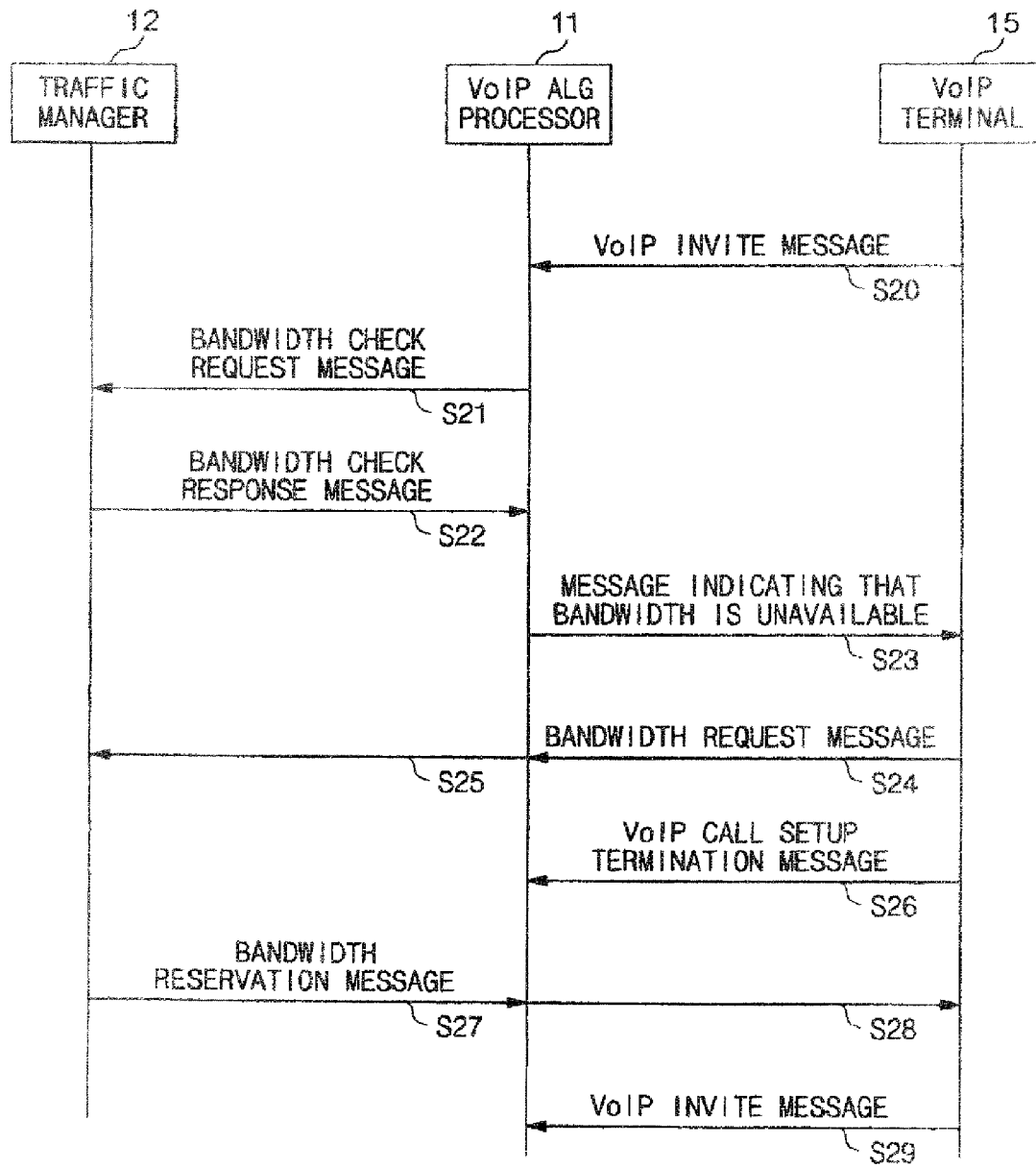
FIG. 2 shows a flow illustrating a method for managing a bandwidth in a voice/data combination system according to the principle of the present invention.

FIG. 2 shows a flow illustrating a method for managing a bandwidth in a voice/data combination system according to the present invention.

As shown in FIG. 2, VoIP terminal 15 generates a VoIP invite message to VoIP ALG processor 11 upon receipt of a request for VoIP call setup with any correspondent terminal in step S20. In this case, the VoIP invite message may be an SIP message having a format as shown in FIG. 3A.

When a VoIP invite message is received from the VoIP terminal 15, VoIP ALG processor 11 parses a payload of the VoIP invite message and changes a header of the VoIP invite message using a prescribed Network Address Translation (NAT) table.

VoIP ALG processor 11 also generates a bandwidth check request message to traffic manager 12 in order to check a bandwidth of a traffic being processed by traffic manager 12 during step S21.

Upon receipt of the bandwidth check request message from VoIP ALG processor 11, traffic manager 12 determines whether the bandwidth for a VoIP service is available based on the bandwidth of the traffic being processed and bandwidth information for VoIP service stored in QoS policy database 14.

Traffic manager 12 provides VoIP ALG processor 11 with a bandwidth check response message including information indicating that the bandwidth for the VoIP service is available during step S22.

When the information indicating that the bandwidth is available is included in the bandwidth check response message provided by traffic manager 12, VoIP ALG processor 11 transmits the VoIP invite message having the changed header to the correspondent terminal over the IP network.

Meanwhile, when the information indicating that the bandwidth is unavailable is included in the bandwidth check response message provided by traffic manager 12, VoIP ALG processor 11 generates a message indicating that the bandwidth is unavailable and transmits the same to VoIP terminal 15 during step S23.

In this case, the message indicating that the bandwidth is unavailable may be composed in a format of an SIP message as shown in FIG. 3B, including information indicating that the bandwidth is unavailable, "Camp-On Bandwidth not Available".

Upon receipt of the message indicating that the bandwidth is unavailable from VoIP ALG processor 11, VoIP terminal 15 generates a bandwidth request message to VoIP ALG processor 11 during step S24.

When the bandwidth request message is received from VoIP terminal 15, VoIP ALG processor 11 provides the received bandwidth request message to traffic manager 12 during step S25.

In this case, the bandwidth request message may be composed in an SIP message format as shown in FIG. 3C, including the bandwidth request information, "Camp-On Bandwidth 30 kbps". The bandwidth request information, "Camp-On Bandwidth 30 kbps" indicates that a bandwidth of 30 kps is necessary for the VoIP service.

After providing the bandwidth request message to VoIP ALG processor 11, VoIP terminal 15 sends a VoIP call setup termination message to VoIP ALG processor 11 during step S26.

Traffic manager 12 reserves the bandwidth based on the bandwidth allocation information included in the bandwidth request message provided by VoIP ALG processor 11, and provides a bandwidth reservation message to VoIP terminal 15 via VoIP ALG processor 11 when the bandwidth is available during steps S27 and S28.

In this case, the bandwidth reservation message may be composed in an SIP message format as shown in FIG. 3D, including the bandwidth reservation information, "Camp-On Bandwidth Reserved".

When the bandwidth reservation message is received from the traffic manager 12, VoIP terminal 15 retransmits the VoIP invite message as shown in FIG. 3A to VoIP ALG processor 11 during step S29.

As described above, according to the voice/data combination system and the method for managing a bandwidth in the system, a determination is made of whether a bandwidth for real-time data service is available, and the bandwidth, when not available, is reserved, so that the real-time data service may be later performed when the bandwidth becomes available.

While the present invention has been described with reference to exemplary embodiments thereof, it will be understood by those skilled in the art that various changes in form and detail may be made therein without departing from the scope of the present invention as defined by the following claims.

The present invention processes real-time packets and general packets in different bandwidth. The disclosed system reserves predetermined bandwidths for real-time packets when bandwidth of real-time packets is not available, and process the real-time packets in their corresponding reserved bandwidth when bandwidth is available. Therefore, real-time packets and general packets are always processed in their corresponding bandwidths. When the bandwidths of both real-time packets and non-real-time packets are not available, the system also reserves a corresponding bandwidth to real-time packets and a corresponding bandwidth to non-real-time packets.

What is claimed is:

1. A voice/data combination system, comprising:
   a terminal to generate and transmit a real-time data service request message upon a receipt of a request for real-time data service, to generate and transmit a bandwidth request message for the real-time data service upon a receipt of a message indicating that a bandwidth for the real-time data service is unavailable, and to retransmit the real-time data service request message upon a receipt of a bandwidth reservation message; and
   a switch/router comprising a processor and a traffic manager, the switch/router being configured to check the bandwidth in response to the real-time data service request message, to transmit the message indicating that the bandwidth, when unavailable, is unavailable, to reserve the bandwidth in response to the bandwidth request message received from the terminal, and to transmit the bandwidth reservation message to the terminal if the bandwidth is available,
   wherein the traffic manager is configured to transmit a bandwidth check response message indicating an availability of the bandwidth to the processor, and
   wherein the processor is configured to transmit the real-time data service request message if the bandwidth check response message indicates that the bandwidth is available.

2. A voice/data combination system, comprising:
   a voice over IP (VoIP) terminal to generate and transmit a VoIP call request message upon receipt of a request for a VoIP call, to generate and transmit a bandwidth request message for the VoIP call upon receipt of a message indicating that a bandwidth for the VoIP call is unavailable, and to retransmit the VoIP call request message upon receipt of a bandwidth reservation message; and
   a switch/router to check the bandwidth in response to the VoIP call request message, to transmit the message indicating that the bandwidth, if unavailable, is unavailable, to reserve the bandwidth in response to the bandwidth request message received from the VoIP terminal, and to transmit the bandwidth reservation message to the VoIP terminal if the bandwidth is available,
   wherein the switch/router comprises:
      a VoIP Application Layer Gateway (ALG) processor to generate and transmit a bandwidth check request message in response to receiving the VoIP call request message from the VoIP terminal, and to transmit the message indicating that the bandwidth is unavailable to the VoIP terminal if information indicating that the bandwidth is unavailable is included in a bandwidth check response message; and
      a traffic manager to check a network state to determine whether the bandwidth for the VoIP call is available in response to the bandwidth check request message, to provide the bandwidth check response message comprising a check result information to the VoIP ALG processor, to reserve the bandwidth in response to the bandwidth request message being received from the VoIP terminal, and to transmit the bandwidth reservation message to the VoIP terminal if the bandwidth is available.

3. A method for managing a bandwidth in a voice/data combination system, the method comprising:
   generating and transmitting, by a terminal, a real-time data service request message-upon receipt of a request for real-time data service;
   checking, by a switch/router comprising a traffic manager and a processor, a network bandwidth in response to the real-time data service request message and transmitting, by the traffic manager, a bandwidth check response message indicating an availability of the network bandwidth to the processor;
   transmitting, by the switch/router, the real-time data service request message if the network bandwidth is available;
   transmitting, by the switch/router, a message indicating that the network bandwidth, if unavailable, is unavailable;
   generating and transmitting, by the terminal, a bandwidth request message for the real-time data service in response to the message indicating that the network bandwidth is unavailable;
   reserving, by the switch/router, the network bandwidth in response to the bandwidth request message received from the terminal, and transmitting a bandwidth reservation message to the terminal if the network bandwidth is available;
   and retransmitting, by the terminal, the real-time data service request message in response to receiving the bandwidth reservation message from the switch/router.

4. A method for managing a bandwidth in a voice/data combination system, the method comprising:
   generating and transmitting, by a voice over IP (VoIP) terminal, a VoIP call request message in response to a VoIP call request from a correspondent terminal;
   checking, by a switch/router comprising a traffic manager and a processor, a network bandwidth in response to the VoIP call request message and transmitting, by the traffic manager, a bandwidth check response message indicating an availability of the network bandwidth to the processor;
   transmitting, by the switch/router, the VoIP call request message to the correspondent terminal if the network bandwidth is available;
   transmitting, by the switch/router, a message indicating that the network bandwidth, if unavailable, is unavailable, to the VoIP terminal;
   generating and transmitting, by the VoIP terminal, a bandwidth request message for a VoIP call in response to the message indicating that the network bandwidth is unavailable;
   and reserving, by the switch/router, the network bandwidth in response to the bandwidth request message received from the VoIP terminal, and transmitting a bandwidth reservation message to the terminal if the network bandwidth is available.

5. The method according to claim 4, further comprising retransmitting, by the VoIP terminal, the VoIP request message in response to the bandwidth reservation message.

6. A voice/data combination system, comprising:
a voice over IP (VoIP) terminal to generate and transmit a VoIP invite message upon receipt of a request for a VoIP call from a correspondent terminal, to generate and transmit a bandwidth request message for a VoIP call upon receipt of a message indicating that a bandwidth for the VoIP call is unavailable, and to retransmit the VoIP invite message upon receipt of a bandwidth reservation message; and
a switch/router comprising a VoIP Application Layer Gateway (ALG) processor and a traffic manager,
wherein the traffic manager is configured to determine an availability of the bandwidth in response to receiving a bandwidth check request message, and to generate a bandwidth check response message indicating the availability of the bandwidth,
wherein the VoIP ALG processor is configured to transmit the VoIP invite message to the correspondent terminal if the bandwidth check response message indicates that the bandwidth is available, and the VoIP ALG processor is configured to generate the message indicating that the bandwidth is unavailable if the bandwidth check response message indicates that the bandwidth is unavailable, and
wherein the VoIP ALG processor is configured to reserve the bandwidth in response to the bandwidth request message received from the VoIP terminal, and to transmit the bandwidth reservation message to the VoIP terminal if the bandwidth is available.

7. The voice/data combination system of claim 6, wherein the bandwidth request message comprises a Session Initiation Protocol (SIP) message comprising a bandwidth request information requesting a bandwidth of 30 kps for the VoIP call.

8. The voice/data combination system of claim 6, wherein the bandwidth reservation message comprises a Session Initiation Protocol (SIP) message comprising a bandwidth reservation information.

9. The voice/data combination system of claim 6, wherein the message indicating that the bandwidth is unavailable comprises a Session Initiation Protocol (SIP) message comprising information indicating that the bandwidth is unavailable.

10. The voice/data combination system of claim 6, wherein the traffic manager comprises a bandwidth measurer and a Quality of Service (QoS) policy database, wherein the bandwidth measurer is configured to determine the availability of the bandwidth in response to the VoIP invite message based on a bandwidth of network traffic being processed and bandwidth information for VoIP stored in the QoS policy database.

* * * * *